(12) United States Patent
Van Den Nieuwelaar et al.

(10) Patent No.: US 8,632,379 B2
(45) Date of Patent: Jan. 21, 2014

(54) IN-LINE BATCHING (75) Inventors: Adrianus Josephes Van Den Nieuwelaar, Gemert (NL); Wilbert Hiddink, Varsseveld (NL); Gerardus Johannes Josephus Cornelissen, PM Mill (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 509 days.

(21) Appl. No.: 12/988,087

(22) PCT Filed: Mar. 12, 2009

(86) PCT No.: PCT/NL2009/000060
§ 371 (c)(1),
(2), (4) Date: Dec. 14, 2010

(87) PCT Pub. No.: WO2009/128703
PCT Pub. Date: Oct. 22, 2009

(65) Prior Publication Data
US 2011/0105001 A1 May 5, 2011

(30) Foreign Application Priority Data
Apr. 17, 2008 (NL) .................................... 2001493

(51) Int. Cl.
*A22C 17/00* (2006.01)
(52) U.S. Cl.
USPC .......................................................... 452/52
(58) Field of Classification Search
USPC .................... 452/52, 53, 106, 107, 149, 150, 452/177–183
See application file for complete search history.

(56) References Cited

U.S. PATENT DOCUMENTS

| 4,096,950 | A | 6/1978 | Brook |
| 4,372,099 | A | 2/1983 | Linville |
| 6,151,866 | A | 11/2000 | Connell |
| 6,983,678 | B2 | 1/2006 | Wattles et al. |
| 7,083,509 | B2 * | 8/2006 | Johnson et al. ................. 452/30 |
| 7,354,338 | B2 * | 4/2008 | Nakamura et al. .............. 452/30 |
| 7,416,429 | B1 * | 8/2008 | Hung ............................ 439/188 |

(Continued)

FOREIGN PATENT DOCUMENTS

| EP | 0343700 A1 | 11/1989 |
| EP | 1815744 A2 | 8/2007 |
| EP | 2 019 297 A1 | 1/2009 |
| GB | 1488346 | 10/1977 |

(Continued)

OTHER PUBLICATIONS

Reply of the patent proprietor to notice of opposition, European Patent No. 2268149, May 8, 2013, pp. 1-10.

*Primary Examiner* — Richard Price, Jr.
(74) *Attorney, Agent, or Firm* — Birch, Stewart, Kolasch & Birch, LLP (57) ABSTRACT

An installation for processing slaughtered animal parts of slaughtered animals and forming batches each containing one or more slaughtered animal parts includes a conveying system with a single conveying device or with a plurality of conveying devices, at least one slaughtered animal treatment device positioned along the path of the conveying device, a first weighing device for determining the weight of the one or more slaughtered animal parts carried by a product carrier, an installation control device including slaughtered animal part position determining device and memory device, and a batching device which is positioned along the path of the conveying device for forming batches each containing one or more slaughtered animal parts.

23 Claims, 8 Drawing Sheets

(56) References Cited

U.S. PATENT DOCUMENTS

| | | |
|---|---|---|
| 7,798,890 B2 * | 9/2010 | Gerrits et al. .................. 452/53 |
| 7,828,639 B2 * | 11/2010 | Nielsen ........................ 452/198 |
| 7,976,368 B2 * | 7/2011 | Haucke et al. ................ 452/184 |
| 8,206,203 B2 * | 6/2012 | Gerrits et al. .................. 452/53 |
| 8,348,144 B2 * | 1/2013 | Thorsson et al. ............. 235/375 |
| 2007/0293980 A1 | 12/2007 | Gudjonsson et al. |

FOREIGN PATENT DOCUMENTS

| | | |
|---|---|---|
| WO | WO 00/23771 A1 | 4/2000 |
| WO | WO 2005/062994 A2 | 7/2005 |
| WO | WO 2005/095904 A1 | 10/2005 |
| WO | WO 2007/072508 A1 | 6/2007 |
| WO | WO 2007/083327 A2 | 7/2007 |
| WO | WO 2007/135818 A1 | 11/2007 |

* cited by examiner

IN-LINE BATCHING

INSTALLATION FOR PROCESSING SLAUGHTERED ANIMAL PARTS OF SLAUGHTERED ANIMALS

The present invention relates to an installation for processing slaughtered animal parts of slaughtered animals and forming batches each containing one or more slaughtered animal parts.

The slaughtered animals to be processed can be poultry, for example chickens, ducks, turkeys, but the invention also relates to the processing of other slaughtered animals such as pigs, cows, etc.

The installation according to the invention comprises a conveying system with a single conveying device or with a plurality of conveying devices, wherein each conveying device comprises:
  an endless conveyor track which follows a path,
    a large number of product carriers, which product carriers are coupled to the conveyor track in a hanging manner, wherein the product carriers are each configured for carrying one or more slaughtered animal parts, and
    drive means for displacing the product carriers in a direction of conveyance along the conveyor track.

In the case of a plurality of conveying devices, there is provided between two conveying devices a transferring device which is configured to receive one or more slaughtered animal parts from a product carrier of one conveying device and to transfer it/them to a product carrier of the other conveying device.

The installation further comprises at least one slaughtered animal treatment device which is positioned along the path of a conveying device and is configured to subject at least some of the passing slaughtered animal parts to a physical treatment.

The installation is further provided with an installation control device which has slaughtered animal part position determining means which pertain to the conveying system and know substantially continuously the position of each slaughtered animal part in the conveying system, and which further has memory means wherein, for each slaughtered animal part in the conveying system, at least one memory field is present for a parameter relating to the slaughtered animal part.

An installation as described hereinbefore is generally known for processing poultry. Installations for processing slaughtered poultry are known in the art, wherein a batching device adapted to the processing of slaughtered animal parts is comprised in the installation.

In the known installations for the processing of slaughtered poultry, physical treatments are carried out on the poultry (for example dividing of the poultry into parts, removing skin, etc.) in the transport system with hanging product carriers in one or usually more poultry treatment devices. The installation control device knows in this case the current position of each poultry part in the conveying system and furthermore collects in suitable memory means a plurality of items of data per poultry part.

In known installations, the poultry parts to be batched are removed from the conveying system with hanging conveyors that is visible to the installation control device and are then transferred to a batching device which in fact functions in a stand-alone manner.

Known batching devices for poultry parts comprise a conveyor belt with a series of collecting holders on one or both sides of the belt. The poultry parts to be batched arrive at the beginning of said conveyor belt. At each collecting holder, a movable selector arm is present which, in an export position, extends over the continuously advancing belt in such a way that a poultry part slides from the belt and arrives in the collecting holder. In a pass position of the selector arm, a poultry part can pass the arm in question, and thus the associated collecting holder. The poultry parts to be batched are weighed just before the conveyor belt and, on the basis of the weight, the selector arms are activated, so that a poultry part arrives in the collecting holder defined by the batching algorithm. Often, a weighing device is provided to determine the total weight of the poultry parts present in the collecting holder.

An object of the invention is to propose improvements and/or alternatives in the field of an installation for processing slaughtered animals, wherein a batching device is present to form batches of slaughtered animal parts.

The invention provides an installation according to 1.

A first weighing device is provided in this installation, which first weighing device is positioned along the path of a conveying device with hanging product carriers and is configured for determining the weight of the one or more poultry parts carried by a product carrier. Suitable weighing devices are for example described in EP 343 700.

The installation control device is embodied in such a way that in the memory means for each poultry part in the conveying system, at least one memory field is present for the weight, determined by the first weighing device, of the slaughtered animal part.

Furthermore, provision is made for the batching device to be coupled to the installation control device.

In this case, the batching algorithm is configured for assembling the batches on the basis of one or more batching parameters, wherein the weight, as stored in the memory means of the installation control means, serves as the first batching parameter.

A portion of the conveying system that is located directly upstream of the batching device forms a buffer section, the beginning of which is defined by the place at which, for each passing product carrier, each batching parameter of the one or more slaughtered animal parts carried by the product carrier is known in the installation control device and is available for the batching algorithm, so that the unload position is selectable on the basis of the buffer algorithm.

In comparison to known installations, a relevant aspect is the integration or coupling of the installation controller to the controller of the batching device and the batching algorithm which calculates the selection of the unload positions. As will become even clearer based on various preferred embodiments, said integration or coupling allows various relevant advantages to be attained as a function of the selected embodiment.

Integration can include the fact that the installation control device, often a complex central computer system which activates the functioning of the conveying system and many treatment devices on the basis of a production plan, also carries out the batching algorithm and thus activates the batching device.

Coupling can include the fact that the installation control device sends data pertaining to the slaughtered animal parts to be batched from the memory means to a remotely positioned batching control device which then carries out the batching algorithm.

A batch to be assembled can in practice contain a plurality of slaughtered animal parts of the same type, for example a batch of drumsticks, chicken quarters, or for example hams. It is however also conceivable for a batch to comprise just one single slaughtered animal part, for example the entire carcass of a slaughtered, eviscerated chicken.

In another possible variant, provision is made for a batch to contain a plurality of slaughtered animal parts of various types, for example a batch comprising drumsticks and chicken quarters. It should be noted in this case that it is conceivable for various types of products, such as the drumsticks and chicken quarters mentioned here, to be transported at the same time in one conveying device with product carriers which are embodied in the same way. It is however also conceivable for there to be provided an installation wherein two conveying devices extend along a common batching device, for example as a result of the fact that the conveyor tracks of said conveying devices run parallel to one another over a distance at the site of the batching device.

In an embodiment which is deemed to be advantageous, provision is made for the memory means for each slaughtered animal part in the conveying system to have a plurality of memory fields, wherein one memory field is present for the weight, determined by the first weighing device, of the slaughtered animal part, and another field is present for a second batching parameter which differs from the weight and relates to the slaughtered animal part. Examples of said second batching parameter are included in this application. In said embodiment, provision is made for the batching algorithm to be configured for assembling the batches at least on the basis of both the weight and the second batching parameter as stored in the memory means of the installation control means.

In a possible embodiment, provision is made for an observation device to be positioned along the path of the conveying system, which observation device is configured for determining the second batching parameter of the one or more slaughtered animal parts carried by a product carrier.

For example, the observation device is configured for carrying out a visual observation using a camera or other optical device, wherein then, on the basis of suitable processing of the optical observation obtained, the second batching parameter is determined and sent to the installation controller.

For example, the second batching parameter is representative of externally visible damage (for example skin damage, contusions) or other external features of the passing slaughtered animal parts (for example colour, dimensions).

Another second batching parameter could be for example the tenderness of the slaughtered animal part, for example as described in EP 1815744.

The second batching parameter could optionally be deployed in such a way that it is established on the basis of the second batching parameter whether or not a slaughtered animal part may form part of a batch, i.e. as a selection parameter. For example, a set of minimum requirements can be placed on the external appearance of the slaughtered animal part and if visual observation reveals that a part does not meet these requirements, the slaughtered animal part in question can be declared unsuitable for inclusion in a batch. If possible, the same observation can also be used to divide the slaughtered animal parts which are suitable for batching into a plurality of quality classes, so that for example batches of a specific weight and a specific quality class can be formed.

The advantages of the invention are for example relevant for carrying out the installation wherein the forming of batches takes place on the basis of the fixed-weight batching principle. In fixed-weight batching, a large group of batches having a specific target weight is formed. The aim is to differ as little as possible from that target weight. That is particularly relevant if fixed-weight, fixed-price batching is deployed, wherein the batches are sold for a fixed price so that any excess weight is given away free of charge.

The invention also relates to batching devices which can be positioned along the path of a conveying devices of the type described here for conveying slaughtered animal parts.

The invention further relates to an abattoir provided with an installation as described herein.

The invention also relates to a method for processing slaughtered animal parts and forming batches each containing one or more slaughtered animal parts, wherein use is made of an installation and/or batching device as described herein.

The invention will be described hereinafter in greater detail with reference to exemplary embodiments shown in the drawings. It will be clear to a person skilled in the art that aspects of these exemplary embodiments can be used if desired in various combinations within the scope of the present invention.

Figure 1:
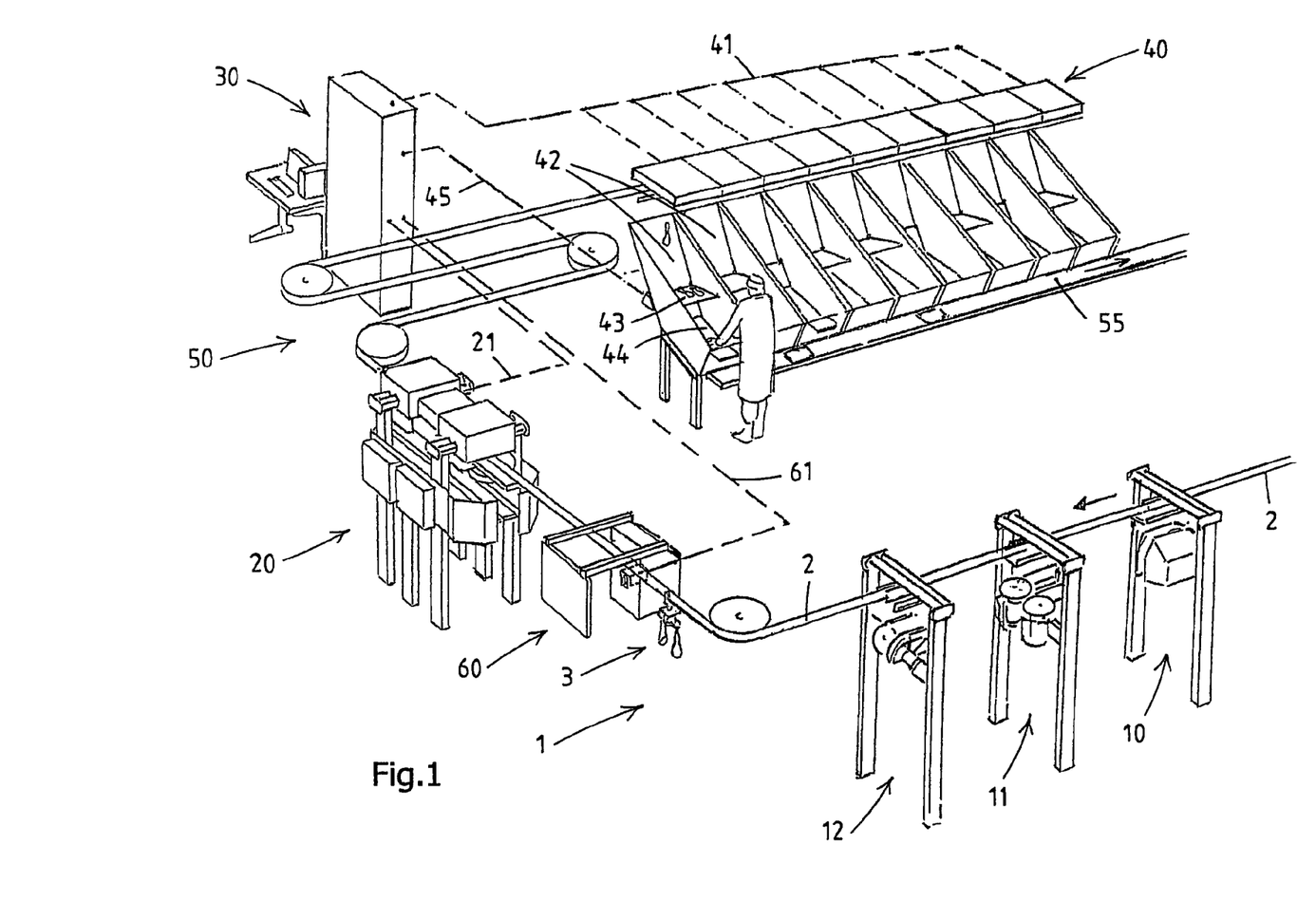
FIG. 1 shows a portion of a first exemplary embodiment of an installation according to the invention.

A first exemplary embodiment of an installation according to the invention will now be described with reference to FIG. 1. FIG. 1 shows merely a portion of the installation, as will become apparent from the further description.

The portion shown of the installation contains components which allow poultry parts of slaughtered poultry to be subjected to one or more physical treatments and subsequently batches to be formed of said poultry parts, in this example fixed-weight batches, that is to say, batches having a predefined target weight (for example on the basis of an order for consumer packagings each containing a batch of poultry parts of this type). In this example and the further examples in this document, parts of chicken will be assumed, but it will be clear that the invention is applicable also to other poultry.

It will also be clear that the inventive idea is also applicable to slaughtered animals such as cows and pigs, etc.

There may be seen a conveying system having in this example a single schematically represented conveying device 1. Said conveying device 1 comprises:
- an endless conveyor track which follows a path 2 (not shown here but in a practical embodiment for example formed by a rail),
- a large number of product carriers 3 (merely a single carrier shown here), which product carriers 3 are coupled to the conveyor track in a hanging manner, wherein the product carriers are each configured for carrying one or more poultry parts (in this example in each case two drumsticks), and drive means (not represented) for displacing the product carriers in a direction of conveyance along the conveyor track.

Examples of conveying devices of this type for one or more poultry parts are generally known.

The embodiment shown of the conveying device reveals—as is preferable—that the endless conveyor track is of the type which is known to experts as an overhead conveying device, wherein the path extends at a distance above the ground, which height can vary along the path.

It is also revealed, as is preferable, that the product carriers 3 are each provided with a trolley part with one or more wheels, which trolley part hangs from a rail construction forming the path. As is preferable, the product carriers are coupled together by a chain or cable.

One or more poultry treatment devices 10, 11, 12, which are each configured to subject at least some of the passing poultry parts to a physical treatment, are positioned along the path 2 of the conveying device. For example, one or more of the devices 10, 11, 12 are cutting devices which are configured to subject the passing poultry parts to a cutting treatment (for example a cutting module to cut off a portion), but also other physical treatments (such as a skinning device for removing skin), a stretching device to stretch parts of the poultry (for example wings), scraping device to scrape off meat, etc. The physical treatment could also be the applying of a marinade or another additive with the aid of a device suitable for this purpose.

Not shown, but certainly conceivable and already implemented in practice is for the treatment device(s) 10-12 to be coupled, as far as their activation and/or data transfer are concerned, to the installation control device 30 which will be described hereinafter in greater detail.

FIG. 1 shows a first weighing device 20 which is positioned along the path 2 of a conveying device and is configured for determining the weight of the one or more poultry parts carried by a product carrier 3. As stated hereinbefore, provision is made in this example for each carrier 3 to carry at the same time two drumsticks. The weighing device 20 can then determine for example the combined weight of the two drumsticks, wherein provision is then made for both drumsticks to be unloaded in the same way in the same collecting holder, i.e. in fact to be treated as a single poultry part. In the event of possible individual unloading of the drumsticks or the like from a product carrier for a plurality of poultry parts, it could for example be assumed that each drumstick weighs half of the measured total weight. As will be described in greater detail, an optional control weighing can correct during the forming of the batch any error in said assumption, or a weighing error by the first weighing device 20.

In another variant, provision is made for the weighing device 20 to separately weigh the weight, during the passing of a carrier 3 which at the same time carries a plurality of poultry parts, for each carried poultry part. In still another variant, each carrier 3 carries just a single poultry part.

The installation further comprises an installation control device 30 which is schematically indicated here in the form of a housing of a computer-controlled device but which in practice can be particularly extensive and complex, such as is known in the specialist field. The installation control device 30 can comprise one or more centrally positioned computers, but could also comprise a network of computers positioned remotely from one another.

The control device 30 comprises poultry part position determining means which pertain to the conveying system and know substantially continuously the position of each poultry part in the conveying system. This is a known aspect in the field of poultry abattoirs and an example of means of this type is described in the Applicant's NL 1024150.

It is also known in the field in question that the control device 30 has memory means wherein, for each poultry part in the conveying system, at least one memory field is present for the weight, determined by the first weighing device, of the poultry part, as is also mentioned in NL 1024150. The transfer of the weights determined by the weighing device 20 to the control device 30 is indicated schematically by the signal line 21.

As stated hereinbefore, one or more of the poultry treatment devices 10-12 can also be connected to the control device 30, for example to subject or not subject selectively determined poultry parts to a treatment and/or to supply to the device 30 data which are defined by the treatment device(s) and relate to the poultry parts, for example to store these data in further fields in the memory means.

Furthermore, FIG. 1 shows a batching device 40 which is positioned along the path of a conveying device and is configured for forming batches each containing one or more poultry parts.

The batching device has a plurality of unload positions along the path 2 of the conveying device 1.

This example shows that said conveying device 1 is the same one which has fed the poultry parts to be batched along one or more poultry treatment devices 10, 11, 12 and along the weighing device 20. Since said conveying device is in fact under the control of the installation controller 30, the batch process could now take place very efficiently, as will be illustrated hereinafter. In addition, the conveying device is here not a separate conveying device pertaining to the batching device, as is conventional in the state of the art. This allows for example space to be saved in the poultry abattoir.

It may be seen in this example that the poultry parts in the section between the passage along the treatment devices 10, 11, 12 and the weighing device 20 to the batching device are not detached from the carrier 3 in question and here too are not transmitted from the one conveying device within the control of the installation control device 30 to another conveying device within the control of the installation control device 30.

In terms of its activation, the batching device 40 is coupled to the installation control device 30 and is configured for selecting, on the basis of an associated batching algorithm, an unload position for the one or more poultry parts carried by a product carrier, wherein in each unload position a collecting holder is present wherein unloaded poultry parts are collected until the batch is complete.

The batching algorithm is configured for assembling the batches at least on the basis of the weight defined by the weighing device 20 as stored in the memory means of the installation control means 30.

A portion of the conveying system 1 that is located directly upstream of the batching device 40 forms a buffer section 50, the beginning of which is defined by the place at which, for each passing product carrier, the weight of the one or more poultry parts carried by the product carrier is known, in this example in the weighing device 20. That weight is available for the batching algorithm at least during the passage of the product carrier through the buffer section 50, in such a way that the unload position is selectable on the basis of the buffer algorithm.

In an embodiment which is deemed to be advantageous in practice, provision is made for the buffer section to have at least a length such that there are 50 product carriers within the buffer section 50, particularly preferably at least 100 product carriers. That offers the batching algorithm a "buffer" of poultry parts, so that the batching algorithm can easily obtain a high yield (that is to say, assemble batches of the intended composition, for example having the intended target weight). For example, the path 2 comprises between the first weighing device 20 and the batching device one or more meandering loops in order in this way to give the buffer section 50 the desired length.

As the line 41 indicates, it is determined on the basis of the batching algorithm in which unload position in drumsticks are unloaded from the carrier 30, for example by operating an unloading actuator in the batching device.

In the exemplary embodiment shown, provision is made for the unloaded poultry parts to fall downward from the product carrier 3 hanging from a rail or the like and to arrive at a collecting holder 42 located in the unload position. Said collecting holders 42 are here part of the batching device 40 and each have walls and a movable bottom 43, in this case side walls and a pivotable bottom flap (having one or more pivotable parts) which is operable by an actuator (not shown).

During the completing of a batch, the bottom flap 43 is in a carrying position, so that the unloaded poultry parts collect on the bottom flap. If the installation controller has noted the batch as being complete, the bottom flap pivots downward, so that the batch of poultry parts enter here a lower holder 44. The bottom flap 43 then pivots back upward, so that a new batch can be formed in the collecting holder. The activation of the bottom flap 43 by the installation controller 30 is indicated schematically by control line 45.

The batch which has arrived in the lower holder 44 should be able to be removed therefrom by hand, but preferably there is also provided there an operable bottom flap which, on opening, releases the batch for further discharge.

In a possible embodiment, provision is made for a discharge of a batch from the batching device to a packaging station or the like by means of a belt conveyor 55 with an endless belt. In a possible embodiment, there are indicated on said belt graphically or otherwise compartments, of which the position in the control device pertaining to the belt conveyor (optionally integrated in the installation control device 30) is constantly known, so that it is known which batch (having which total weight) is located in which compartment. Said information can then for example be used during the packaging of the batch in question in a consumer packaging, for example to indicate the total weight.

The batching device 40 can be provided with a second weighing device which is configured for determining the weight of poultry parts which have collected in a batch, i.e. in this example, a second weighing device in each collecting holder. In this way, the weight of the batch can be monitored and any errors by the first weighing device 20 are compensated for. This increases the accuracy of the batch process and has, for example in fixed-weight, fixed-price batching, the advantage that the "give-away", the giving-away of excess weight for free, can efficiently be kept as low as possible.

In a variant which is deemed to be particularly advantageous of the installation according to the invention, provision is made for the memory means for each poultry part in the conveying system to have a plurality of memory fields, wherein one memory field is present for the weight, determined by the first weighing device 20, of the poultry part, and another field is present for a second batching parameter which differs from the weight and relates to the poultry part. In this case, the term "batching parameter" refers to a parameter which is variable with regard to the poultry parts in the conveying system and a parameter forming part of the batching algorithm.

The batching algorithm does not then work exclusively on the basis of the weight determined by the first weighing device 20, but is then configured for assembling the batches at least on the basis of both the weight and the second batching parameter as stored in the memory means of the installation control means.

That means that the portion of the conveying system that is located directly upstream of the batching device and that forms the buffer section has a beginning which is defined by the place at which, for each passing product carrier, both the weight and the second batching parameter of the one or more poultry parts carried by the product carrier are known. During the time for which the product carrier in question with poultry parts is located in the buffer section, the batching algorithm can then determine in which unload position the poultry parts in question can best be unloaded.

In the example of FIG. 1, provision is made for an observation device 60 to be positioned along the path 2 of the conveying system, which observation device 60 is configured for determining the second batching parameter of the one or more poultry parts carried by a product carrier 3.

For example, the observation device 60 is configured for carrying out a visual observation using a camera or other optical device, wherein then, on the basis of suitable processing of the optical observation obtained, the second batching parameter is determined and sent to the installation controller 30, indicated schematically here by signal line 61.

For example, the second batching parameter is representative of externally visible damage (for example skin damage, contusions) or other external features of the passing poultry parts (colour, dimensions).

Figure 2:
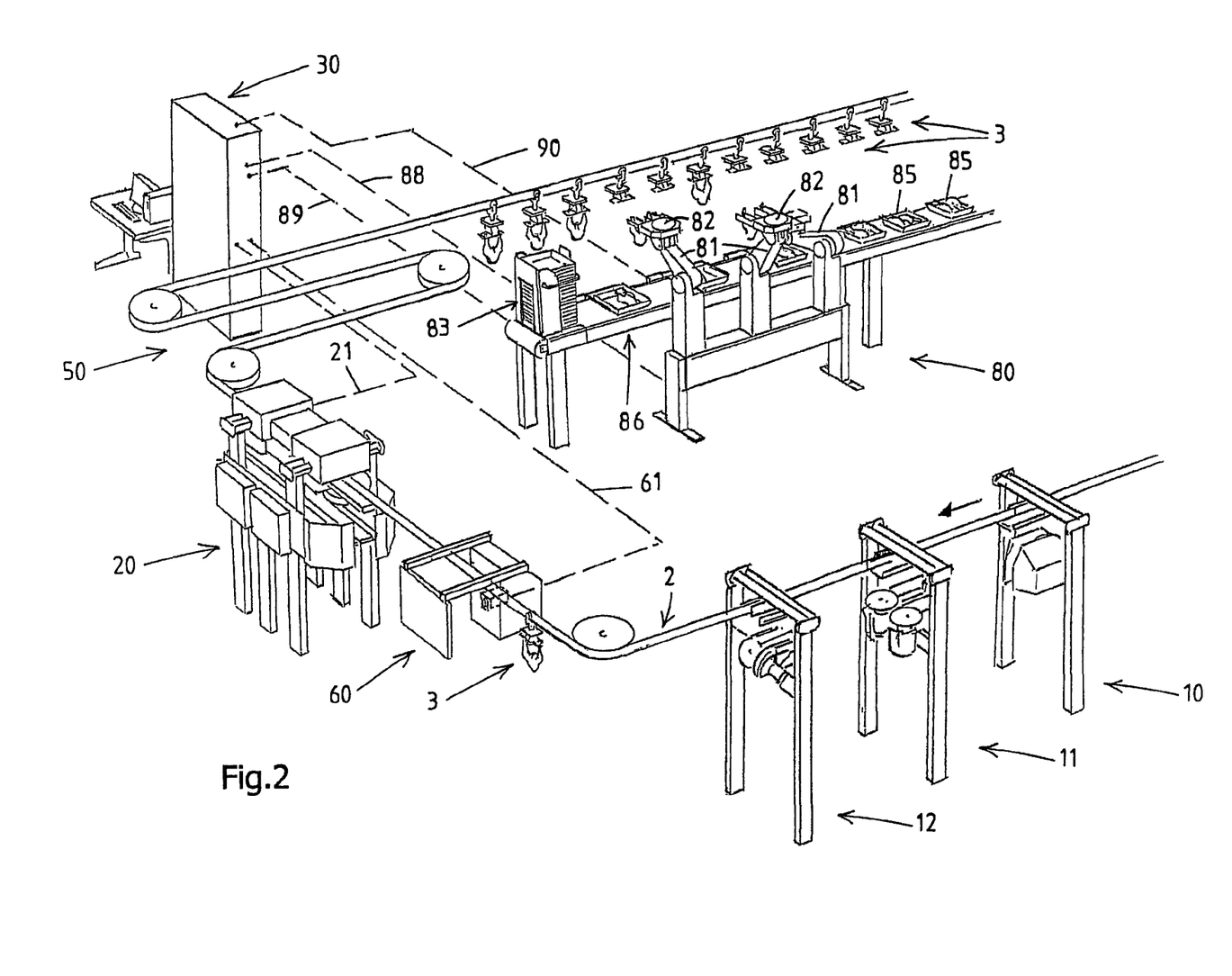
FIG. 2 shows a portion of a second exemplary embodiment of an installation according to the invention.

In FIG. 2, components corresponding in terms of construction and/or function to components which have been described with reference to FIG. 1 are provided with the same reference numerals.

In FIG. 2, another batching device 80 is positioned along the path 2 of the conveying device, wherein said conveying device forms between the weighing device 20 and the batching device 80 the buffer section 50 described hereinbefore.

As described hereinbefore, the buffer algorithm should if desired be able to make use of both the weight and a second batching parameter, for example a second parameter determined using the camera device 60.

The batching device 80 has here, in each unload position along the path 2, a movable arm 81 provided with a gripper assembly 82 which is configured to securely grip the one or more poultry parts carried by a product carrier 3 and then to remove it/them from the product carrier. In this example, the gripper assembly 82 is configured to grip poultry parts hanging in the product carrier, here two leg parts (such as drumsticks or quarters) next to each other.

In this batching device 80, there is further provided a holder 83 for a supply (here a stack) of collecting holders 85—here, as is preferable, of upwardly open trays—which do not form part of the batching device and for example are embodied as (part of) a consumer packaging wherein the batch products are ultimately offered in shops to the consumer.

The batching device is provided with a collecting holder transporting device 86 which displaces the collecting holders from the supply holder 83 to a filling position where the poultry parts are placed in the collecting holder by the movable arm with the gripper assembly 82. In this example, there is provided a belt conveyor 86 which feeds the collecting holders along all movable arms 81.

It is conceivable for poultry parts, which are unloaded from the conveying device 1 in various unload positions, to arrive in a single collecting holder of poultry parts, since the batching device is able to bring a collecting holder 85 into the range of a plurality of movable arms 81 with the gripper assembly 82.

Each of the movable arms 81, which for example can be embodied as a (multiaxial) industrial robot, is activated at the command of the batching algorithm which is processed here in the control device 30. The movable arms 81 are activated via signal line 88 which is indicated schematically here.

The activating of a mechanism, here a destacker, to release a collecting holder 85 from the supply holder 83, takes place also from the control device 30, here via schematically indicated signal line 89.

Provision may be made for the movable arms 81 to be provided with or coupled to a control weighing device, so that a control weighing signal can be supplied to the control device 30, here via schematically indicated signal line 90.

Figure 3:
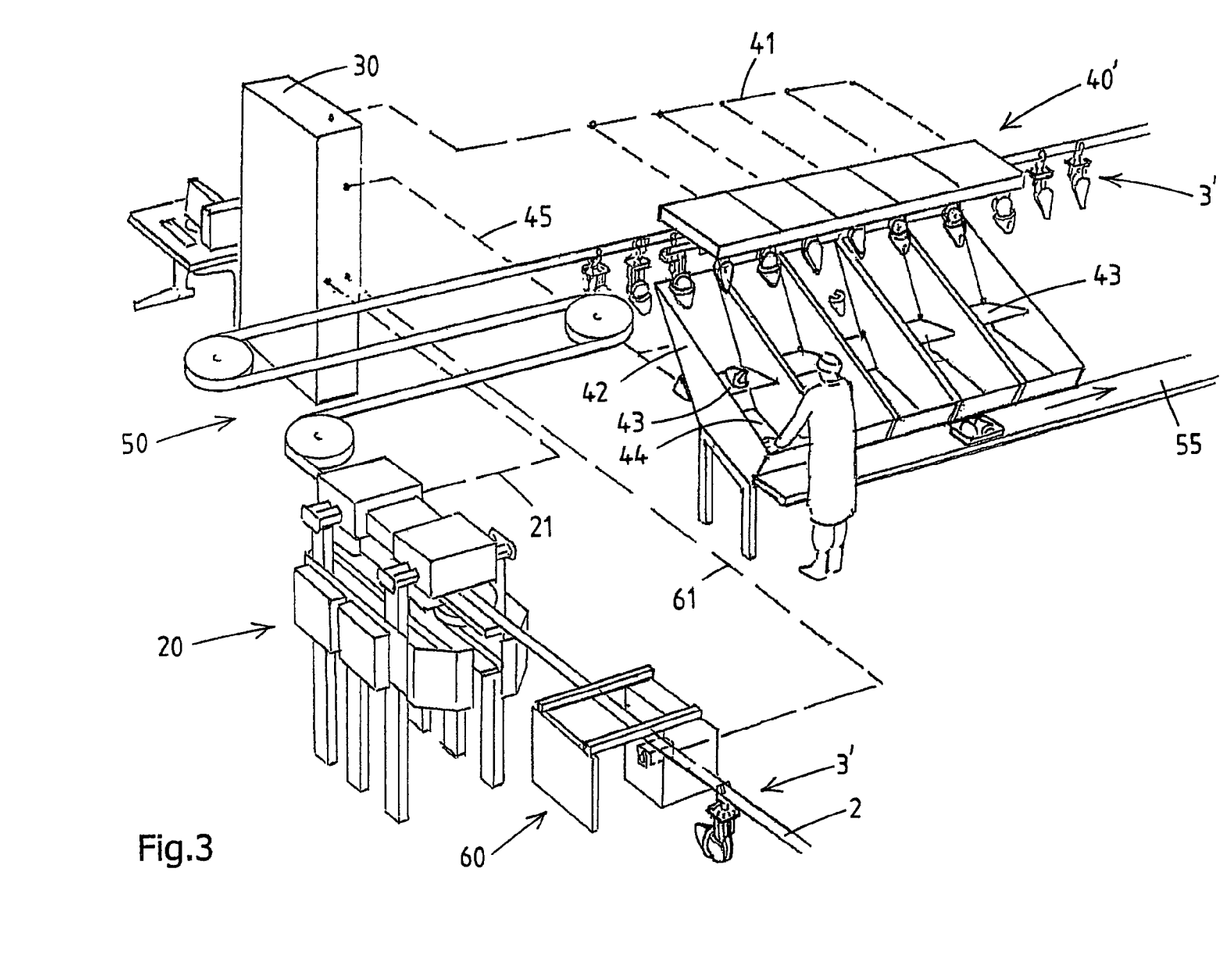
FIG. 3 shows a portion of a third exemplary embodiment of an installation according to the invention.

FIG. 3 shows a variant of the installation according to FIG. 1, wherein components corresponding in terms of construction and/or function to components which have been described with reference to FIG. 1 are provided with the same reference numerals.

The product carriers 3' are here of an embodiment known per se, and are each provided with a cone which sticks into the poultry part to be carried. For example, the cone can be used for conveying the breast cap or the front half of slaughtered poultry.

As is known and preferable, the cone is pivotable about a plurality of axes, for example at least about a vertical axis and a horizontal axis, so that the cone can be brought into various spatial positions. In the past, product carriers 3' of this type have been used in conveying devices which move the poultry parts along one or more treatment devices, for example a cutting device or devices, a skinner, etc. (for example the treatment devices 10, 11, 12).

FIG. 3 shows that the path 2 of the conveying device provided with a conveying device of this type extends along the batching device 40', so that the poultry parts carried by these product carriers 3' can be released directly into collecting holders 44.

For example, there is provided in each unload position an unloading actuator which moves the poultry part in question from the cone. If the product carrier 3' is also provided with a locking mechanism for the poultry part, for example a movable hook as is known in the art, then that locking mechanism will also be disengaged to unload the poultry part.

Figure 4:
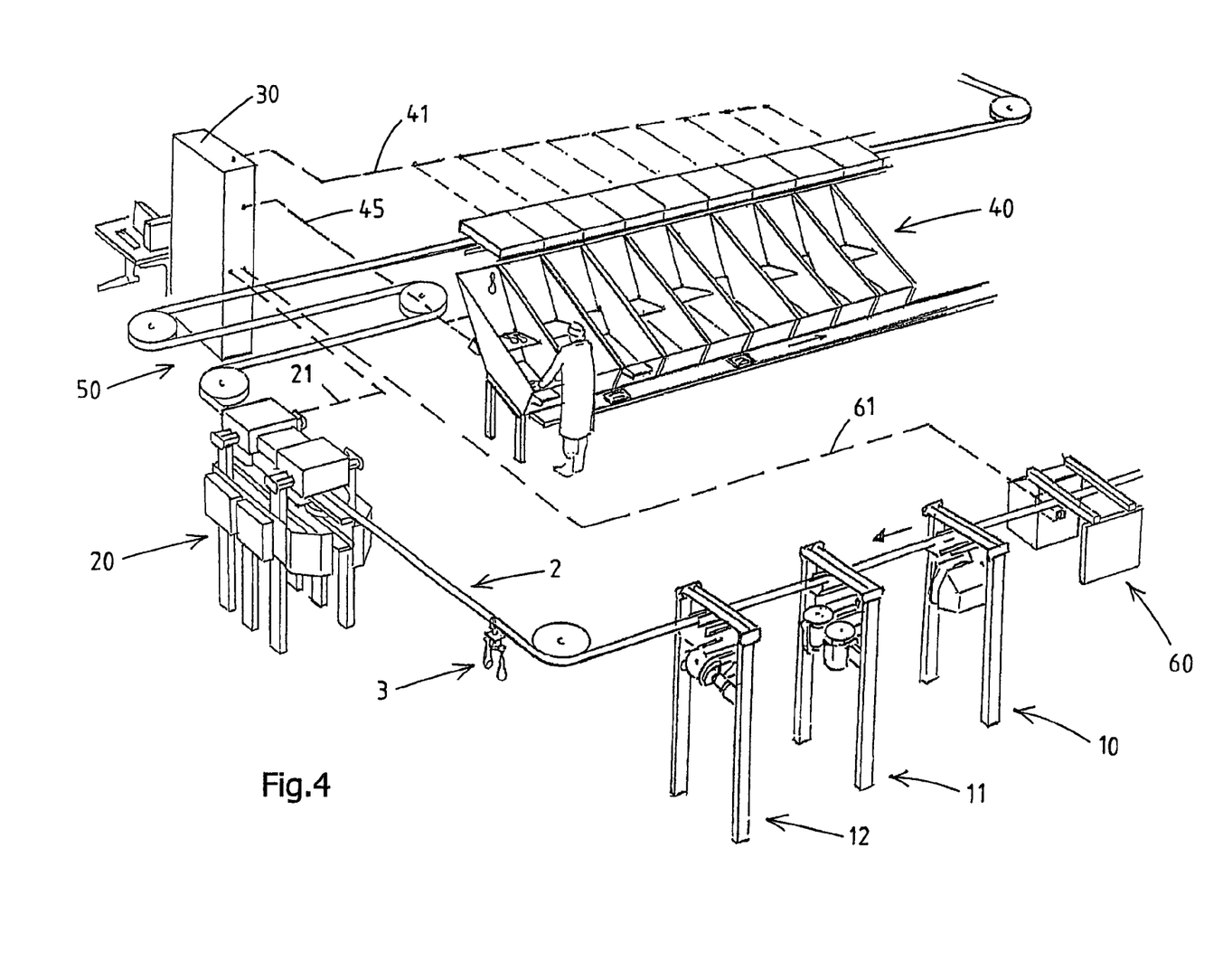
FIG. 4 shows a portion of a fourth exemplary embodiment of an installation according to the invention.

FIG. 4 shows a variant of the installation according to FIG. 1, wherein components corresponding in terms of construction and/or function to components which have been described with reference to FIG. 1 are provided with the same reference numerals.

It may be seen that the device 60, which serves here for observing a second batching parameter upstream of one or more poultry treatment devices 10, 11, 12, is positioned along the path of the conveying device. For example, the device 60 could also be positioned between treatment devices of this type.

It is conceivable for the second batching parameter to be a parameter which is substantially independent of the ensuing physical treatment(s) carried out on the poultry part, for example the colour and/or the presence of damage (such as for example skinning).

As stated hereinbefore, the second batching parameter can (also) be used to select parts, so that the selected parts no longer form part of a batch to be formed, for example because the external appearance of the part in question does not meet specific minimum requirements. It will be clear that in such a case there is provided an unloading station, for example upstream of the batching device, for unloading slaughtered animal parts which are not unloaded in the batching device.

It is also conceivable for the second batching parameter also to be used by the installation control device 30 to activate the functioning of one or more poultry treatment devices, which are positioned downstream of the point at which the second batching parameter is determined, for example to establish whether or not a specific poultry part must undergo treatment by said subsequent treatment device. Obviously, the signal lines are then lines between the control device 30 and each of said poultry treatment devices 10, 11, 12 which are not represented here.

Figure 5:
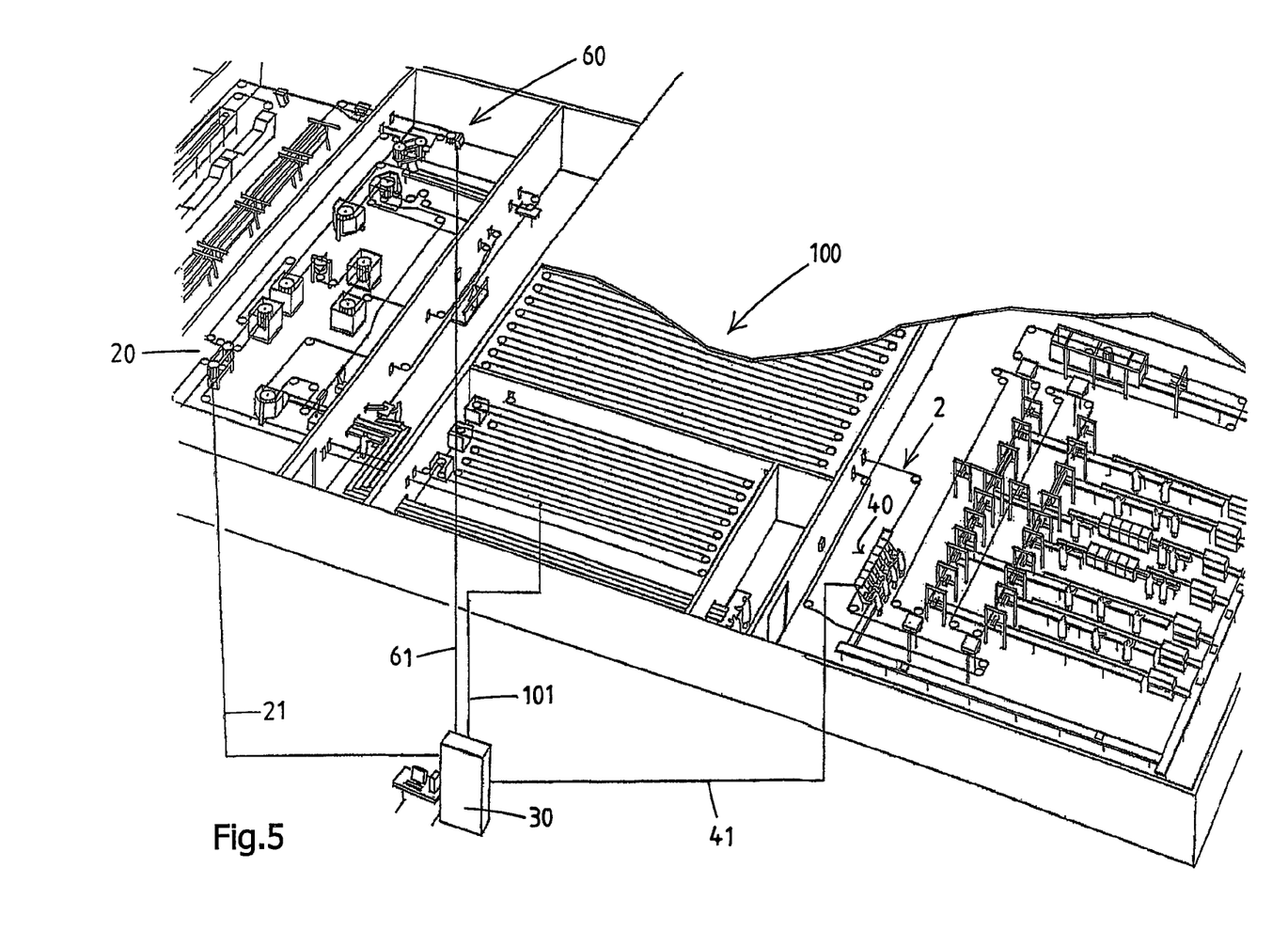
FIG. 5 shows an overview of an abattoir for poultry wherein a fifth exemplary embodiment of an installation according to the invention is installed.

FIG. 5 shows an overview of an abattoir for poultry wherein a fifth exemplary embodiment of an installation according to the invention is installed.

The abattoir includes an installation of which the parts corresponding in terms of function and/or construction to components of the installation in FIG. 1 are provided with the same reference numerals.

A person skilled in the art will recognize at "the input side" of the abattoir devices for slaughtering the poultry, removing the feathers, removing the entrails, inspecting the slaughtered poultry and/or entrails, etc.

These "input-side devices" are generally upstream of a system for cooling the slaughtered poultry that is denoted here by reference numeral 100. After cooling-down of the slaughtered poultry, (further) physical treatments of the poultry are generally carried out by one or more downstream (i.e. output-side) devices, such as for example dividing the poultry into parts, marinating, etc.

On this output side, the forming of batches also takes place, here using a batching device 40 which is positioned directly upstream of the cooling system 100, so that cooled poultry parts are supplied directly to said batching device. For example, the batching device 40 which is positioned there is intended for batching whole carcasses, but it is also possible for provision to be made for the poultry already to be divided upstream of the cooling system 100, for example so as to form back halves which are then cooled in the cooling system.

It may be seen that, in this example, there are already determined upstream of the cooling system 100 one or more of the batching parameters used for the batching algorithm (i.e. the weight and/or a second batching parameter), preferably all batching parameters so that in fact the length of the conveying system extending through the cooling system is available as the buffer section 50. Since the length of the conveying system through the cooling system comprises more than one thousand product carriers, often more than ten thousand product carriers, the matching algorithm can have an enormous buffer of poultry parts and thus provide very optimum results.

This example shows that the weight, which serves as the batching parameter, is determined in the weighing device 20 which is positioned upstream of the cooling system 100. Here, the weighing device 20 is embodied as a transferring device between two conveying devices, wherein the transferring device is provided with an integrated weighing mechanism. Transferring devices of this type are known in this specialist field. In this example, the conveying device positioned downstream of the transferring device 20 is then that device extending through the one or more cooling spaces and/or along one or more cooling-promoting devices (cold water spray, etc.).

It may be seen that here the batching device 40 is positioned along the same conveying device which feeds the poultry parts through the cooling system 100.

In this example, it may be seen that the second batching parameter, which differs from the weight, is determined upstream of the cooling system, in this example using a camera device which observes visual aspects, here of whole poultry directly after the slaughter and removal of the feathers but prior to the removal of the entrails. For example, it is thus possible to establish whether the poultry has an external appearance so as to be suitable to be selected as a whole carcass (after removal of entrails and cooling) in the batching device 40, which is positioned directly after the cooling system, and unloaded into a collecting holder of the batching device. In this case, it is conceivable for a batch to consist just of a single bird having the desired external appearance and weight. By determining said two batching parameters even before the start of the cooling system, the batching algorithm can function optimally by designing the suitable specimens in the buffer section to be unloaded in the batching device 40. The poultry which have not been unloaded are then processed in the devices which are positioned downstream, where the poultry will often be divided into parts.

When carrying out visual observation for establishing the second batching parameter on a poultry part with a wing, it is preferable to position a wing stretching device upstream of the observation device, so that the wing is stretched and the body is thus more clearly visible.

In FIG. 5, the signal line 101 indicates schematically that a batching parameter, optionally even a third batching parameter, can be observed or otherwise deduced on the basis of the cooling process and/or in the cooling system 100.

Figure 6:
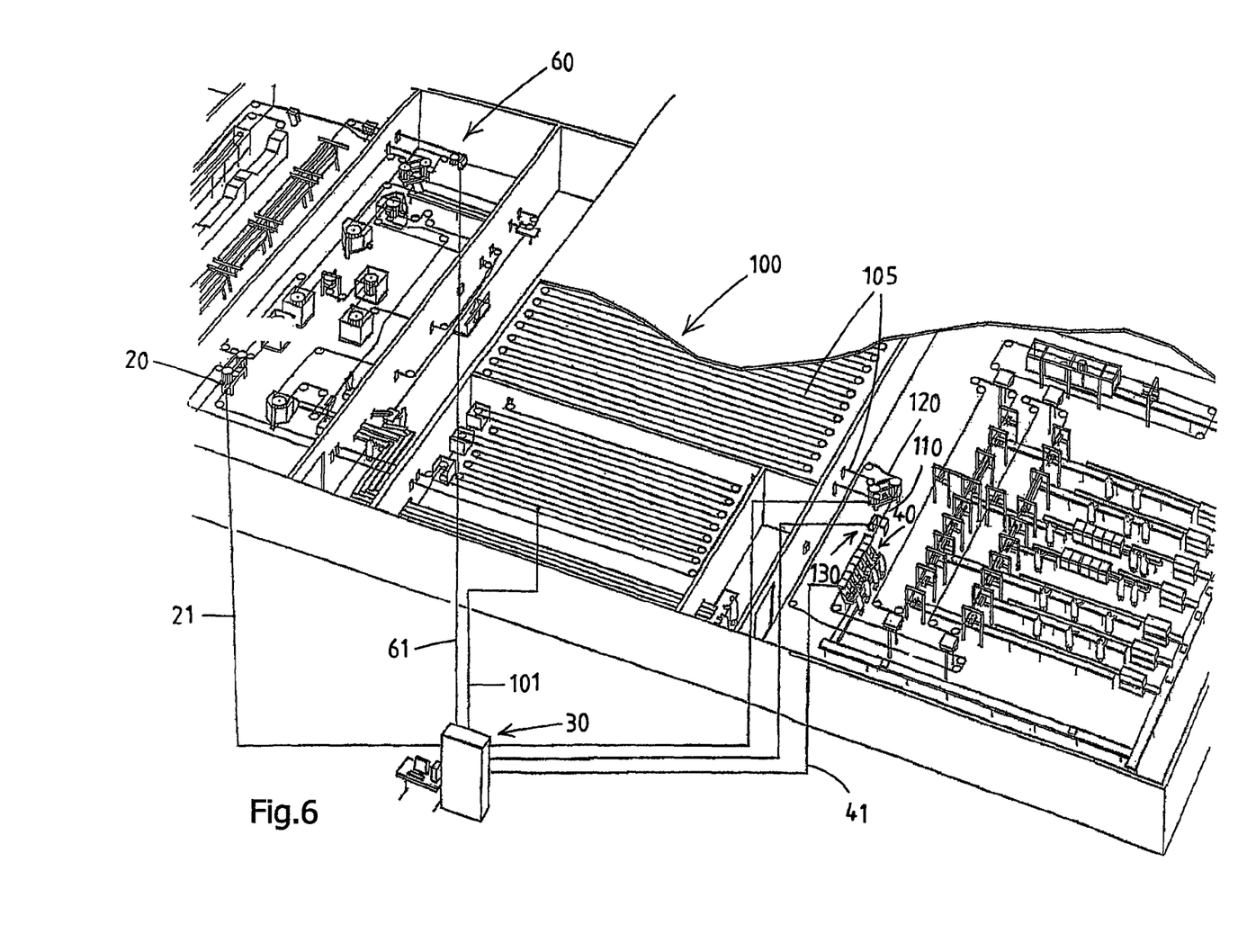
FIG. 6 shows an overview of an abattoir for poultry wherein a sixth exemplary embodiment of an installation according to the invention is installed.

FIG. 6 shows a variant of the abattoir according to FIG. 5, wherein the parts corresponding in terms of function and/or construction to components of the installation in FIG. 5 are provided with the same reference numerals.

A difference from the installation of FIG. 5 is the fact that the batching device 40 is positioned here along a conveying device 110 which does not extend here through the cooling system 100 but which is positioned directly downstream of the conveying device 105 extending through the cooling system. A transferring device 120 is present between these conveying devices. It is relevant that the two conveying devices 105, 110 and also the transferring device 120 fall within the range of the control device 30, at least as far as the locating means are concerned, so that of each poultry part, it is known where it is located at any moment in that conveying system which is now constructed from a plurality of conveying devices.

In said embodiment, the transferring from the conveying device 105 to the conveying device 110 does not influence the possibility to make use, for the batching algorithm, of one or more batching parameters which are already defined upstream of the cooling system 100. After all, said parameters remain, despite the transferring from one conveying device to the other, uniquely coupled in the memory means to the poultry part.

The transferring device 120 could be configured as a transferring device with a weighing function, for example to monitor the weight after passing through the cooling system. For example, in the event of an undesired difference from that weight, it could then still be decided by the batching algorithm not to unload the poultry part in question in the device 40.

The same monitoring could be carried out using a further camera device 130 which is coupled to the control device, for example so that in the event of an undesired external appearance after cooling, the poultry is not selected for the batch.

The parameters determined directly downstream of the cooling system, such as for example weight and/or external features of the cooled poultry part, can of course be used for activating one or more processes taking place downstream of the cooling system, for example for activating one or more poultry treatment devices. This is generally known in the specialist field.

It is conceivable for the parameters determined directly downstream to be used not for batching the poultry parts which emerge directly from the cooling system (and are not further processed), but rather for the subsequent treatments described hereinbefore and/or for batch processes taking place later.

Figure 7:
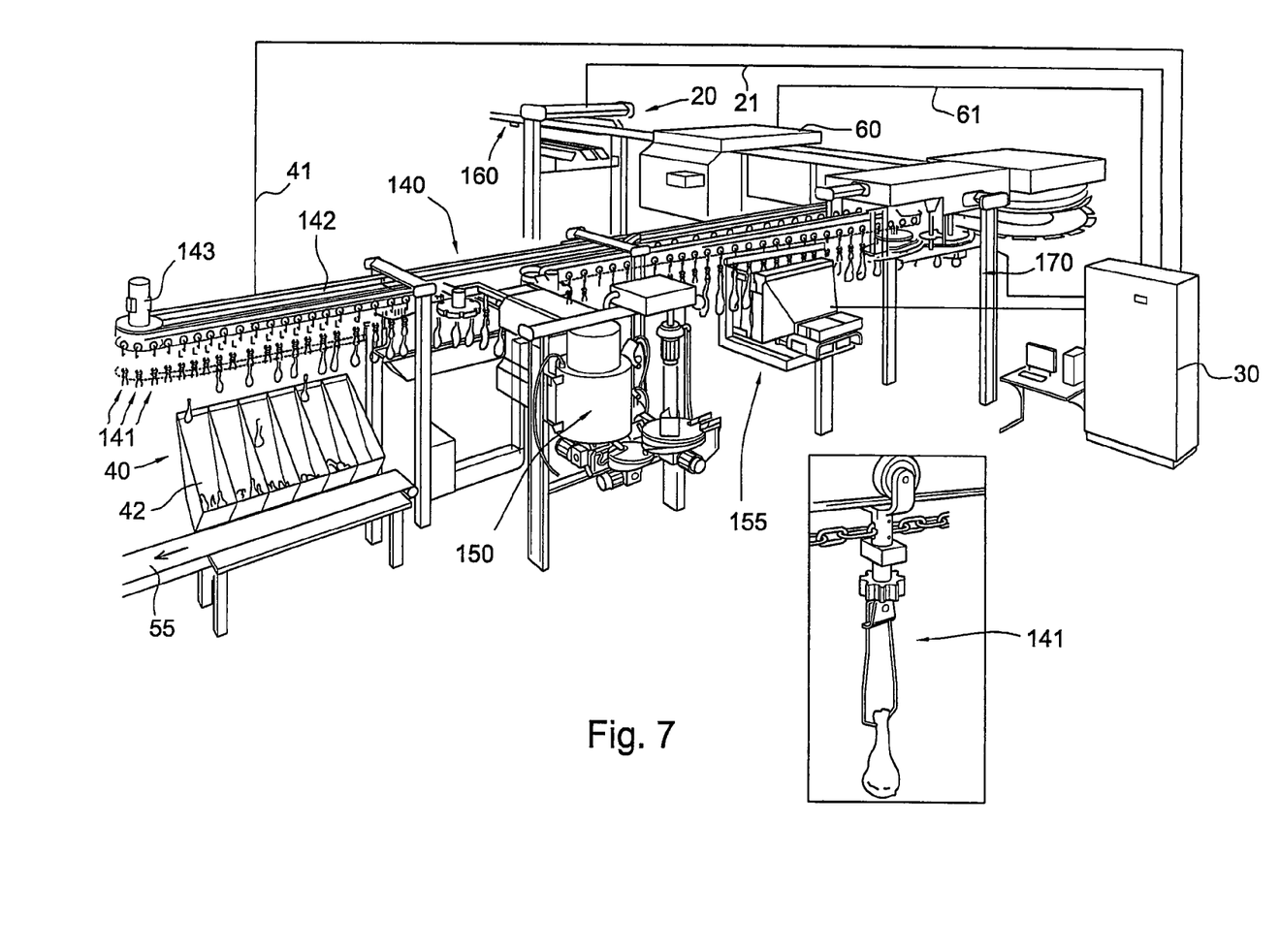
FIG. 7 shows a portion of a seventh exemplary embodiment of an installation according to the invention.

FIG. 7 shows an exemplary embodiment of an installation according to the invention, wherein provision is made for poultry parts to be treated externally with an additive, for example by applying one or more layers and/or particles to the outside of the poultry part. An example is the application of a marinade coating to the outside of the product such as is known in the art, for example in accordance with EP 1792541 or EP 1737300.

There may be seen a conveying device 140 having product carriers 141 (shown on a larger scale in the insert) which can be displaced along an endless track 142 by a drive with a motor 143. One or here more devices are positioned along the conveying device 140 for externally applying additive to the poultry parts, denoted here by 150 and 155. For example, a device 155 applies an adhesion-promoting additive, and the device 150 subsequently a marinade coating, for example as described in EP 1737300.

A batching device 40 is positioned downstream of the one or more additive applying devices 150, 155, along the same conveying device 140. Unloading actuators, which do not pertain to said device 40, are positioned in each unload position and bring about, at the command of the batching algorithm, unloading of a poultry part from the product carrier 141, are not shown.

The weight, as a parameter for batching, is determined in this example by the first weighing device 20 which in this example is positioned not in the conveying device 140 but in a conveying device 160 placed upstream therefrom, for example a conveying device extending also along one or more poultry treatment devices where the poultry is divided into pieces.

As described hereinbefore, a transferring device 170 is positioned between the devices 160 and 140, so that the control device 30 knows the current position of each poultry part in the conveying devices 160, 140.

Any increase in the weight of the poultry parts as a result of the application of additive can be disregarded for batching or factored in on the basis of an assumed uniform increase in weight.

As has been shown, an optional second batching parameter could also be determined upstream of the conveying device, for example a parameter related to the external appearance of the poultry part. Said parameter could then also be used for activating the application(s) of additive.

In a variant, the transferring device 170 is also embodied as a first weighing device, so that the section between said transferring device 170 and the batching device acts as a buffer section for the batching process.

Figure 8:
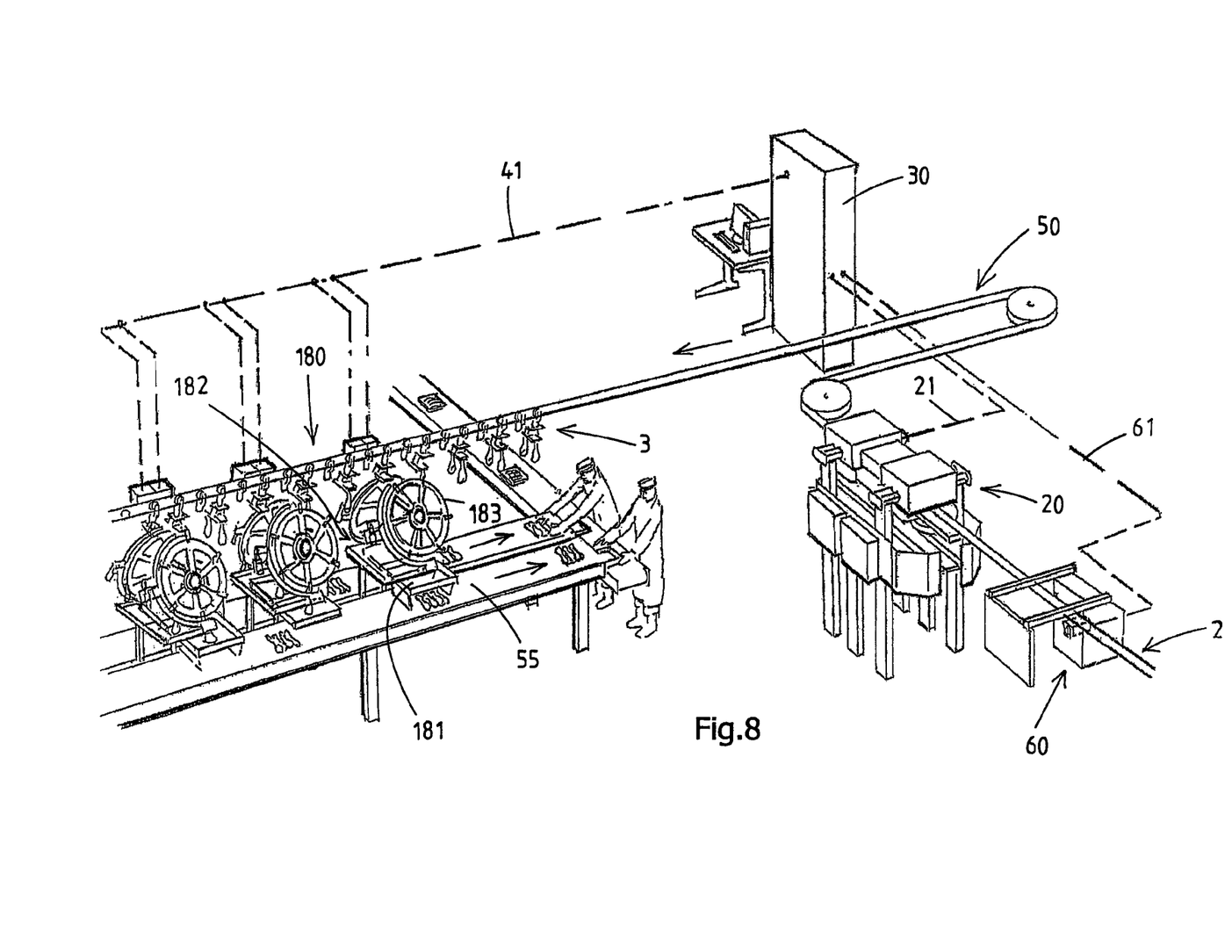
FIG. 8 shows a portion of an eighth exemplary embodiment of an installation according to the invention.

FIG. 8 shows a variant of the installation according to FIG. 1, wherein the parts corresponding in terms of function and/or construction to components of the installation in FIG. 1 are provided with the same reference numerals.

There may be seen a batching device 180 which is configured to be able, in product carriers which carry two poultry parts next to each other and supply them to the batching device independently of each other, to unload into various collecting holders 181, 182.

Said idea could also be implemented in the batching device 40, for example by positioning a group of collecting holders 42 on both sides of the path of the conveying device and by providing at each collecting holder an unloading actuator which unloads the individual poultry part from the product carrier.

In FIG. 8, provision is made for the positioning in each unload position of a movable poultry part lifter 183, embodied there as a rotatable wheel with a gripper, which is then already operable, for a poultry part.

In the event of suitable operation, a lifter 183 of this type grips the poultry part to be unloaded and deposits the poultry part into a collecting holder 181, 182 pertaining to the batching device. When the batch is complete, said batch can be taken out (optionally by hand) of the collecting holder and/or be discharged in a suitable manner or by a suitable mechanism.

The invention claimed is:

1. Installation for processing slaughtered animal parts of slaughtered animals and forming batches each containing one or more slaughtered animal parts, which installation comprises:
    a conveying system with a single conveying device or with a plurality of conveying devices, wherein each conveying device comprises:
        an endless conveyor track which follows a path,
        a large number of product carriers, which product carriers are coupled to the conveyor track in a hanging manner, wherein the product carriers are each configured for carrying one or more slaughtered animal parts, and
        a drive device configured to displace the product carriers in a direction of conveyance along the conveyor track,
    wherein in the case of a plurality of conveying devices, there is provided between two conveying devices a transferring device which is configured to receive one or more slaughtered animal parts from a product carrier of a conveying device and to transfer it/them to a product carrier of the other conveying device,
    at least one slaughtered animal treatment device which is positioned along the path of a conveying device and is configured to subject at least some of the passing slaughtered animal parts to a physical treatment,
    a first weighing device, which first weighing device is positioned along the path of a conveying device and is configured for determining the weight of the one or more slaughtered animal parts carried by a product carrier,
    an installation control device comprising:
        a slaughtered animal part position determining device which pertains to the conveying system and knows substantially continuously the position of each slaughtered animal part in the conveying system,
        a memory device wherein, for each slaughtered animal part in the conveying system, at least one memory field is present for the weight, determined by the first weighing device, of the slaughtered animal part,
        a batching device which is positioned along the path of a conveying device for forming batches each containing one or more slaughtered animal parts, which batching device has a plurality of unload positions along the path of the conveying device,
    wherein the batching device is coupled to the installation control device and is configured for selecting, on the basis of an associated batching algorithm, an unload position for the one or more slaughtered animal parts carried by a product carrier, wherein there is present in each unload position a collecting holder wherein unloaded slaughtered animal parts are collected until the batch is complete,
    wherein the batching algorithm is configured for assembling the batches on the basis of at least one batching parameters, wherein the weight, as stored in the memory device of the installation control device, serves as the first batching parameter,
    wherein a portion of the conveying system that is located directly upstream of the batching device forms a buffer section, the beginning of which is defined by the place at which, for each passing product carrier, each batching parameter of the one or more slaughtered animal parts carried by the product carrier is known in the installation control device and is available for the batching algorithm, so that the unload position is selectable on the basis of the buffer algorithm.

2. Installation according to claim 1, wherein the length of the buffer section is such that at least 50 product carriers are present therein.

3. Installation according to claim 1, wherein the collecting holders form part of the batching device.

4. Installation according to claim 1, wherein a collecting holder has walls and a movable bottom, which bottom is operable by an associated actuator, in such a way that, with the bottom in a carrying position, the unloaded slaughtered animal parts collect on the bottom and in such a way that, with the bottom in a discharge position, the batch of slaughtered animal parts is dispensed from the collecting holder.

5. Installation according to claim 1, wherein there is provided a discharge of a batch from the batching device to a packaging station or the like by a belt conveyor with an endless belt, wherein there are indicated in a possible embodiment on said belt graphically or otherwise compartments, of which the position in the control device pertaining to the belt conveyor is constantly known, so that it is known which batch (having which total weight) is located in which compartment on the endless belt.

6. Installation according to claim 1, wherein the batching device is provided with a second weighing device which is configured for determining the weight of slaughtered animal parts collected in a collecting holder.

7. Installation according to claim 1, wherein provision is made for the memory device for each slaughtered animal part in the conveying system to have a plurality of memory fields, wherein one memory field is present for the weight, determined by the first weighing device, of the slaughtered animal part, and another field is present for a second batching parameter which differs from the weight and relates to the slaughtered animal part, wherein the batching algorithm is configured for assembling the batches at least on the basis of both the weight and the second batching parameter as stored in the memory device of the installation control device.

8. Installation according to claim 7, wherein an observation device is positioned along the path of the conveying system, which observation device is configured for determining the second batching parameter of the one or more slaughtered animal parts carried by a product carrier.

9. Installation according to claim 8, wherein the installation control device is coupled to one or more slaughtered animal treatment devices, which are positioned downstream of the point at which the second batching parameter is determined, in order to activate the functioning of these devices and wherein the second batching parameter is also used by the installation control device to control the functioning of these one or more slaughtered animal treatment devices.

10. Installation according to claim 9, wherein the second batching parameter is also used by the installation control device to establish whether or not a specific slaughtered animal part must undergo treatment by said subsequent treatment device.

11. Installation according to claim 1, wherein the batching device is provided with a holder for a supply of collecting holders which do not form part of the batching device and are embodied as (part of) a consumer packaging wherein the batch products are ultimately offered in shops to the consumer.

12. Installation according to claim 1, wherein the product carriers are each provided with a cone which sticks into the slaughtered animal part to be carried, which cone is pivotable about a plurality of axes, so that the cone can be brought into various spatial positions.

13. Installation according to claim 12, wherein the batching device is provided in each unload position with an unloading actuator which moves the slaughtered animal part in question from the cone, and wherein, if the product carrier is also provided with a locking mechanism for the slaughtered animal part, then that locking mechanism will also be disengaged to unload the slaughtered animal part.

14. Installation according to claim 13, wherein the locking mechanism is a movable hook.

15. Installation according to claim 1, wherein the installation further comprises a cooling system for cooling down slaughtered animal parts of slaughtered animals, wherein the conveying system extends from one or more devices upstream of the cooling system to one or more devices downstream of the cooling system, which downstream devices comprise at least one batching device, and wherein there are determined upstream of the cooling system one or more of the batching parameters used for the batching algorithm (the weight and/or the second batching parameter), so that then the length of the conveying system extending through the cooling system is available as a buffer section.

16. Installation according to claim 15, wherein the second batching parameter, which differs from the weight, is determined upstream of the cooling system, using a camera device which observes visual aspects of the entire slaughtered animal immediately after the slaughter and removal of the feathers but prior to the removal of the entrails.

17. Installation according to claim 15, wherein the batching device is positioned along a conveying device which does not extend through the cooling system and which is positioned directly downstream of the conveying device extending through the cooling system, wherein a transferring device is present between these conveying devices, wherein the two conveying devices and also the transferring device fall within the range of the control device, at least as far as the locating means are concerned, so that of each slaughtered animal part, it is known where it is located at any moment in that conveying system constructed from a plurality of conveying devices.

18. Installation according to claim 1, wherein the product carriers passing along the batching device are configured to carry two slaughtered animal parts next to each other and to supply them to the batching device, and wherein the batching device is configured to unload the slaughtered animal parts, independently of one another, into various collecting holders.

19. Installation according to claim 1, wherein the collecting holders are packaging holders.

20. Installation according to claim 1, wherein the installation further comprises downstream of the batching device an unloading station for unloading slaughtered animal parts which are not or do not become unloaded in the batching device.

21. Abattoir for slaughtering animals, provided with an installation according to claim 1.

22. Method for processing slaughtered animal parts and forming batches each one or more slaughtered animal parts, wherein use is made of an installation and/or batching device according to claim 1.

23. Installation according to claim 1, wherein the length of the buffer section is such that at least 100 product carriers are present therein.

* * * * *